(12) United States Patent
Diamant

(10) Patent No.: US 9,569,372 B2
(45) Date of Patent: *Feb. 14, 2017

(54) REDIRECTION COMMUNICATION

(71) Applicant: Intel Corporation, Santa Clara, CA (US)

(72) Inventor: Nimrod Diamant, Ksar-Saba (IL)

(73) Assignee: Intel Corporation, Santa Clara, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 14/098,836

(22) Filed: Dec. 6, 2013

(65) Prior Publication Data

US 2014/0101338 A1   Apr. 10, 2014

Related U.S. Application Data

(63) Continuation of application No. 13/088,116, filed on Apr. 15, 2011, now Pat. No. 8,626,969, which is a continuation of application No. 11/027,754, filed on Dec. 30, 2004, now Pat. No. 7,949,798.

(51) Int. Cl.
| | |
|---|---|
| *G06F 13/12* | (2006.01) |
| *G06F 13/10* | (2006.01) |
| *G06F 3/06* | (2006.01) |
| *H04L 29/08* | (2006.01) |

(52) U.S. Cl.
CPC ........... *G06F 13/102* (2013.01); *G06F 3/0607* (2013.01); *G06F 3/067* (2013.01); *G06F 3/0658* (2013.01); *G06F 3/0661* (2013.01); *H04L 67/141* (2013.01)

(58) Field of Classification Search
CPC .................................................. G06F 3/067
See application file for complete search history.

(56) References Cited

U.S. PATENT DOCUMENTS

| | | |
|---|---|---|
| 4,539,655 A | 9/1985 | Trussell et al. |
| 4,792,896 A | 12/1988 | Maclean et al. |
| 5,581,715 A | 12/1996 | Verinsky et al. |
| 5,812,820 A | 9/1998 | Loram |
| 5,889,965 A | 3/1999 | Wallach et al. |
| 6,192,477 B1 | 2/2001 | Corthell |

(Continued)

OTHER PUBLICATIONS

Non-Final Office Action received for U.S. Appl. No. 11/286,513, mailed on Nov. 5, 2010, 11 pages.

(Continued)

*Primary Examiner* — Henry Tsai
*Assistant Examiner* — Juanito Borromeo
(74) *Attorney, Agent, or Firm* — Christopher K. Gagne

(57) ABSTRACT

A method and system of communicating data to or from a remote computer. The remote computer is accessed by a CPU as though it were a local IDE controller attached to a local IDE device. A peripheral device distinct from the CPU provides a set of virtual IDE device registers and an IDE controller to the central processing unit. The peripheral device receives data written to the set of virtual IDE device registers, and transmits the data into a network, addressed for reception by the remote computer. The remote computer receives the data, interprets it, and performs operations upon a mirror set of device data. The remote computer then responds, and transmits its response across the network to the peripheral device. The peripheral device communicates the response to the CPU in a fashion identical to an physical IDE controller attached to a physical IDE device.

13 Claims, 9 Drawing Sheets

(56) References Cited

U.S. PATENT DOCUMENTS

| | | | |
|---|---|---|---|
| 6,530,050 | B1 | 3/2003 | Mergard |
| 6,606,164 | B1 | 8/2003 | Irie et al. |
| 6,826,387 | B1 | 11/2004 | Kammer |
| 6,834,326 | B1 | 12/2004 | Wang et al. |
| 6,881,096 | B2 | 4/2005 | Brown et al. |
| 7,003,563 | B2 | 2/2006 | Leigh et al. |
| 7,043,205 | B1 | 5/2006 | Caddes et al. |
| 7,155,512 | B2 | 12/2006 | Lean et al. |
| 7,162,638 | B2 | 1/2007 | Yoshihiro |
| 7,225,247 | B2 | 5/2007 | Kennedy et al. |
| 7,284,278 | B2 | 10/2007 | Anson et al. |
| 7,400,648 | B2 | 7/2008 | Cromer et al. |
| 7,457,847 | B2 | 11/2008 | Ramey |
| 7,543,277 | B1 | 6/2009 | Righi et al. |
| 7,721,013 | B2 | 5/2010 | Diamant |
| 7,949,798 | B2 | 5/2011 | Diamant |
| 7,986,844 | B2 | 7/2011 | Diamant |
| 8,150,973 | B2 | 4/2012 | Diamant |
| 8,626,969 | B2 | 1/2014 | Diamant |
| 2002/0054029 | A1 | 5/2002 | Glancy et al. |
| 2003/0061401 | A1 | 3/2003 | Luciani, Jr. |
| 2003/0105850 | A1 | 6/2003 | Lean et al. |
| 2003/0172171 | A1 | 9/2003 | Ueno |
| 2003/0194908 | A1 | 10/2003 | Brown et al. |
| 2003/0229727 | A1 | 12/2003 | Wang |
| 2004/0128412 | A1 | 7/2004 | Harrison |
| 2004/0177264 | A1 | 9/2004 | Anson et al. |
| 2004/0181590 | A1 | 9/2004 | Liou et al. |
| 2004/0249985 | A1 | 12/2004 | Mori et al. |
| 2005/0015430 | A1 | 1/2005 | Rothman et al. |
| 2006/0059336 | A1 | 3/2006 | Miller et al. |
| 2006/0149860 | A1 | 7/2006 | Diamant |
| 2006/0168099 | A1 | 7/2006 | Diamant |
| 2007/0005821 | A1 | 1/2007 | Diamant |
| 2007/0005828 | A1 | 1/2007 | Diamant |
| 2007/0005867 | A1 | 1/2007 | Diamant |
| 2007/0116110 | A1 | 5/2007 | Diamant |
| 2008/0244212 | A1 | 10/2008 | Rothman et al. |
| 2008/0294800 | A1 | 11/2008 | Diamant |
| 2011/0196970 | A1 | 8/2011 | Diamant |
| 2012/0143990 | A1 | 6/2012 | Diamant |

OTHER PUBLICATIONS

Response to Final Office Action for U.S. Appl. No. 11/286,513, filed Mar. 9, 2011, 11 pages.
Response to Non-Final Office Action for U.S. Appl. No. 11/286,513, filed Jun. 10, 2010, 8 pages.
Response to Non-Final Office Action for U.S. Appl. No. 11/286,513, filed Jan. 3, 2011, 10 pages.
Response to Final Office Action for U.S. Appl. No. 11/286,513, filed Sep. 15, 2010, 11 pages.
Non-Final Office Action received for U.S. Appl. No. 13/369,439, mailed on May 15, 2012, 16 pages.
Response to Non-Final Office Action received for U.S. Appl. No. 13/369,439, field Jul. 18, 2012, 13 pages.
Final Office Action received for U.S. Appl. No. 13/369,439, mailed on Sep. 21, 2012, 36 pages.
Non-Final Office Action received for U.S. Appl. No. 13/369,439, mailed on Jul. 29, 2013, 16 pages.
Notice of Allowance received for U.S. Appl. No. 13/369,439, mailed on Nov. 25, 2013, 12 pages.
Response to Non-Final Office Action received for U.S. Appl. No. 13/369,439, filed Sep. 10, 2013, 11 pages.
Response to Final Office Action received for U.S. Appl. No. 13/369,439, filed Nov. 26, 2012, 10 pages.
Non-Final Office Action received for U.S. Appl. No. 13/088,116, mailed on Jun. 6, 2012, 8 pages.
Response to Non-Final Office Action received for U.S. Appl. No. 13/088,116, filed Aug. 15, 2012, 10 pages.
Notice of Allowance received for U.S. Appl. No. 13/088,116, mailed on Nov. 8, 2012, 8 pages.
Non-Final Office Action received for U.S. Appl. No. 13/088,116, mailed on Jun. 11, 2013, 18 pages.
Notice of Allowance received for U.S. Appl. No. 13/088,116, Mailed on Sep. 11, 2013, 9 pages.
Microsoft, "Virtual PC 2004 Evaluation Guide", Nov. 2003, pp. 1-20.
IPMI, "Intelligent Platform Management Interface Specification Second Generation V2.0", Document Revision 1.0, Feb. 12, 2004, 23 pages.
FIPS "Secure Hash Standard", Federal Information Processing Standards Publication 180-1, Apr. 17, 1995, 18 pages.
American Megatrends, "MegaRAC M200 OPMA Based Remote Management Controller", Aug. 22, 2005, 2 pages.
Non-Final Office Action for U.S. Appl. No. 11/804,836, mailed on Mar. 18, 2009, 10 pages.
Response to Non-Final Office Action for U.S. Appl. No. 11/804,836, filed Jun. 16, 2009, 14 pages.
Final Office Action for U.S. Appl. No. 11/804,836, mailed on Sep. 17, 2009, 9 pages.
Notice of Allowance for U.S. Appl. No. 11/804,836, mailed on Dec. 28, 2009, 7 pages.
Supplemental Amendment for U.S. Appl. No. 11/804,836, filed Dec. 28, 2009, 8 pages.
Response to Non-Final Office Action for U.S. Appl. No. 11/804,836, filed Nov. 12, 2009, 14 pages.
Response to Office Action for U.S. Appl. No. 11/027,917, filed Aug. 25, 2011, 17 pages.
Advisory Action received for U.S. Appl. No. 11/027,917, mailed on Jan. 13, 2010, 3 pages.
Advisory Action received for U.S. Appl. No. 11/027,917, mailed on Mar. 16, 2011, 3 pages.
Advisory Action received for U.S. Appl. No. 11/027,917, mailed on Mar. 15, 2010, 3 pages.
Final Office Action received for U.S. Appl. No. 11/027,917, mailed on Oct. 29, 2010, 20 pages.
Final Office Action received for U.S. Appl. No. 11/027,917, mailed on Dec. 24, 2009, 19 pages.
Non-Final Office Action received for U.S. Appl. No. 11/027,917, mailed on May 25, 2011, 18 pages.
Non-Final Office Action received for U.S. Appl. No. 11/027,917, mailed on Jun. 22, 2010, 19 pages.
Non-Final Office Action received for U.S. Appl. No. 11/027,917, mailed on Sep. 4, 2008, 16 pages.
Final Office Action received for U.S. Appl. No. 11/027,917, mailed on Apr. 15, 2009, 23 pages.
Non-Final Office Action received for U.S. Appl. No. 11/027,917, mailed on Aug. 31, 2009, 13 pages.
Supplemental Amendment for U.S. Appl. No. 11/027,917, filed Dec. 28, 2009, 8 pages.
Response to Final Office Action for U.S. Appl. No. 11/027,917, filed Feb. 26, 2010, 11 pages.
Response to Final Office Action for U.S. Appl. No. 11/027,917, filed Mar. 29, 2011, 18 pages.
Response to Non-Final Office Action for U.S. Appl. No. 11/027,917, filed Sep. 22, 2010, 14 pages.
Response to Non-Final Office Action for U.S. Appl. No. 11/027,917, filed Jan. 5, 2009, 19 pages.
Response to Non-Final Office Action for U.S. Appl. No. 11/027,917, filed Jun. 12, 2009, 15 pages.
Response to Non-Final Office Action for U.S. Appl. No. 11/027,917, filed Oct. 9, 2009, 13 pages.
Notice of allowance received for U.S. Appl. No. 11/027,917, mailed on Nov. 10, 2011, 17 pages.
Response to Final Office Action for U.S. Appl. No. 11/027,917, filed Feb. 25, 2011, 15 pages.
Response to Advisory Action for U.S. Appl. No. 11/027,917, filed Mar. 29, 2010, 13 pages.
Advisory Action received for U.S. Appl. No. 11/027,754, mailed on Jun. 30, 2008, 3 pages.
Final Office Action received for U.S. Appl. No. 11/027,754, mailed on Sep. 23, 2010, 18 pages.
Non-Final Office Action received for U.S. Appl. No. 11/027,754, mailed on Mar. 15, 2010, 20 pages.

(56) References Cited

OTHER PUBLICATIONS

Non-Final Office Action received for U.S. Appl. No. 11/027,754, mailed on Aug. 8, 2007, 24 pages.
Final Office Action received for U.S. Appl. No. 11/027,754, mailed on May 8, 2008, 26 pages.
Non-Final Office Action received for U.S. Appl. No. 11/027,754, mailed on Dec. 9, 2008, 9 pages.
Final Office Action received for U.S. Appl. No. 11/027,754, mailed on Jun. 2, 2009, 9 pages.
Response to Non-Final Office Action for U.S. Appl. No. 11/027,754, filed Jul. 15, 2010, 20 pages.
Response to Non-Final Office Action received for U.S. Appl. No. 11/027,754, filed Jan. 31, 2008, 42 pages.
Response to Final Office Action for U.S. Appl. No. 11/027,754, filed Jun. 17, 2008, 10 pages.
Response to Non-Final Office Action for U.S. Appl. No. 11/027,754, filed Mar. 9, 2009, 25 pages.
Response to Final Office Action received for U.S. Appl. No. 11/027,754, filed Jun. 24, 2009, 16 pages.
Supplemental Response to Office Action for U.S. Appl. No. 11/027,754, filed Dec. 28, 2009, 10 pages.
Notice of Allowance received for U.S. Appl. No. 11/027,754, mailed on Feb. 10, 2011, 6 pages.
Response to Final Office Action received for U.S. Appl. No. 11/027,754, filed Jan. 24, 2011, 10 pages.
Final Office Action for U.S. Appl. No. 11/286,513 mailed on Jan. 26, 2011, 15 pages.
Final Office Action received for U.S. Appl. No. 11/286,513, mailed on Jul. 15, 2010, 11 pages.
Non-Final Office Action received for U.S. Appl. No. 11/286,513, mailed on May 4, 2010, 14 pages.
Notice of Allowance received for U.S. Appl. No. 11/286,513, mailed on Mar. 30, 2011, 7 pages.

REDIRECTION COMMUNICATION

CROSS-REFERENCE TO RELATED APPLICATIONS

This application is a continuation of prior co-pending U.S. patent application Ser. No. 13/088,115, filed Apr. 15, 2011, which is a continuation of prior U.S. patent application Ser. No. 11/027,754, filed Dec. 30,2004.

TECHNICAL FIELD

Embodiments of the present invention relate to computing systems that may utilize IDE redirection communication schemes, and more particularly to computing systems that may utilize an IDE redirection communication scheme with a virtual IDE interface and protocols tailored for such an application.

BACKGROUND

In environments in which a limited number of information technology (IT) personnel must maintain the operability of a great many computers, it is important to provide tools that permit such personnel to perform such maintenance tasks remotely. For example, in a situation in which a given computer must have an operating system installed, it is inconvenient for IT personnel to physically travel to the particular computer in order to perform the installation. Tools that permit the installation of the operating system by delivering the operating system across a network would eliminate the need for the IT personnel to travel, and would increase efficiency.

Some basic input/output systems (BIOS), support a feature whereby a LAN controller may be used to access a remote boot server. Executable code is downloaded from the remote boot server, and is then run by the system. Just prior to running the downloaded executable code, the connection to the remote server is closed by the BIOS.

The aforementioned scheme exhibits a shortcoming, however. Some programs need access to the media from whence they originated, while they are being executed. For example, in the context of loading an operating system, only a small portion of the operating system may be downloaded at the time execution begins. Thereafter, downloaded portion attempts to access the remainder of the operating system from the media. Such a feat is not possible in the context of the remote server scheme mentioned above, because the BIOS closes the connection to the remote boot server prior to execution of the downloaded code. Thus, at the time the downloaded portion of the operating system seeks access to the remainder of the operating system, the connection to the remote boot server is unavailable. Consequently, no access to the remainder of the operating system may be obtained, and the installation fails.

From the foregoing discussion, it is evident that there exists a need for a scheme by which to redirect device commands and data to and from a network, even after execution of downloaded code has begun.

DETAILED DESCRIPTION

As used herein, the term "integrated device electronics (IDE) device" refers to an Advanced Technology Attachment (ATA) device, and the terms may be used interchangeably. The specifications governing these devices are promulgated by the InterNational Committee on Information Technology Standards (INCITS), which operates under the American National Standards Institute (ANSI). The specifications include ANSI NCITS 317-1998 AT Attachment—4 with Packet Interface Extension, ANSI NCITS 340-2000 AT Attachment—5 with Packet Interface, and ANSI NCITS 361-2002 AT Attachment—6 with Packet Interface. Therefore, the term "IDE device" or "ATA device" refers to any device behaving in accordance with these specifications or any such similar specification promulgated in the future.

Figure 1:
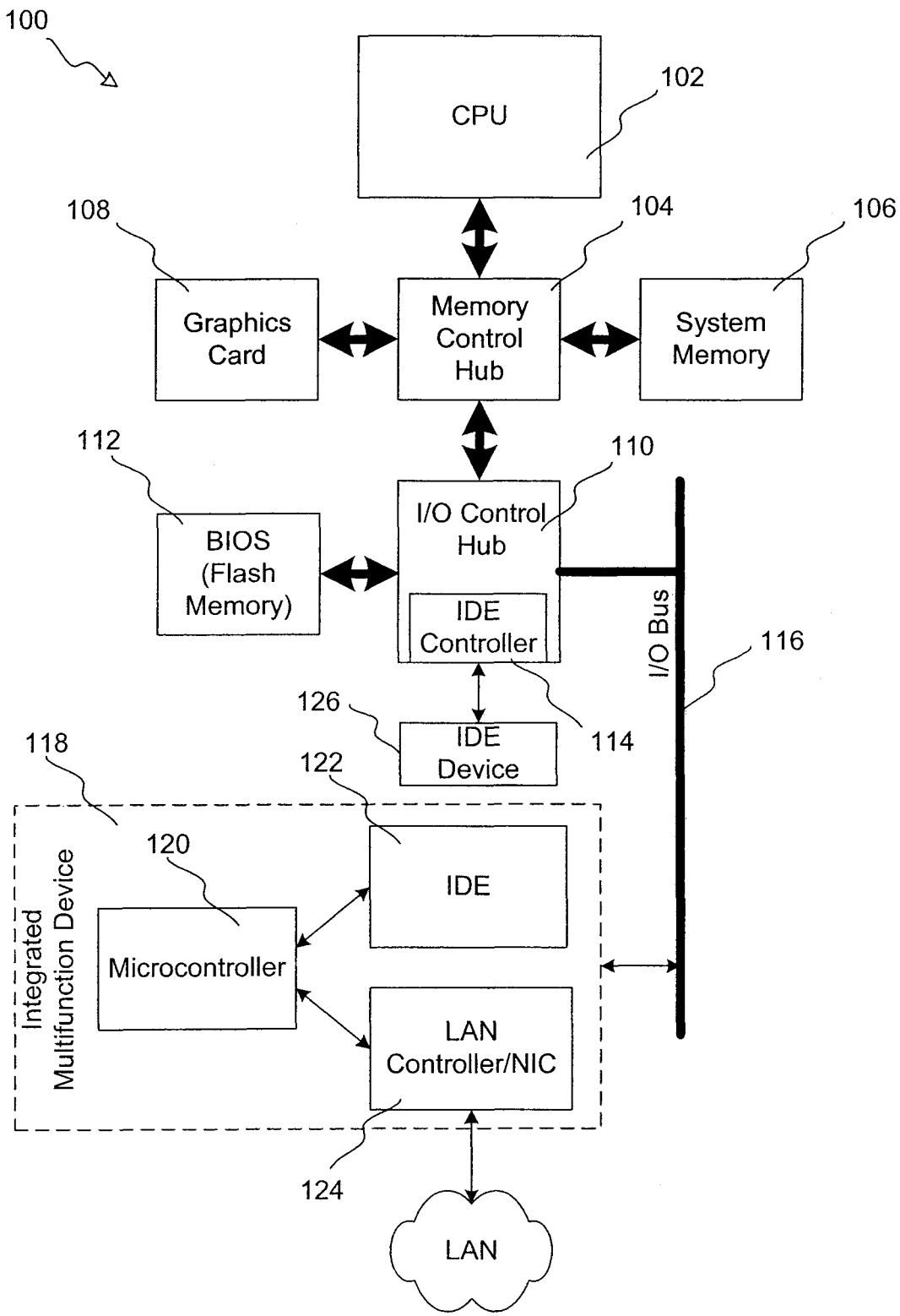
FIG. 1 depicts a computing system that employs a virtual IDE interface, according to one embodiment of the present invention.

FIG. 1 depicts one example of a computing system 100 that redirects device commands and data to a network, without rooting the source of such redirection in the system BIOS. As can be seen from FIG. 1, the computing system 100 includes a CPU 102, which is coupled to a memory control hub 104. The memory control hub 104 is an arrangement of circuitry that manages and controls access to the system memory 106, graphics card 108, and the input/output (I/O) control hub 110. The I/O control hub 110, in turn, manages and controls access to a flash memory device 112, which stores the BIOS. In one embodiment, it manages and controls access to a IDE controller 114, which is embodied as a part of the I/O control hub 110. An IDE device 126 is coupled to the controller 114. The IDE device 126 communicates data to and from the host via the controller 114. In another embodiment, the I/O control hub 110 also manages and controls access to an I/O bus 116, such as a peripheral component interconnect (PCI) bus. (In an embodiment, the I/O control hub 110 also manages and controls access to audio channels, USB ports, and other I/O devices that are known in the art, but are not important in the context of this disclosure, and are not depicted herein).

Coupled to the I/O bus 116 is an integrated multifunction device 118. As discussed in more detail below, an integrated multifunction device 118 is a single device that provides more than one function. In the particular example depicted in FIG. 2, the integrated multifunction device 118 is a single device that offers an IDE device function and a LAN controller function. Such an integrated multifunction device 118 may be presented in the marketplace as a LAN controller with built-in manageability features.

The integrated multifunction device 118 may include a microcontroller 120 coupled to a virtual IDE interface 122 (discussed below) and a LAN controller 224. By "virtual" IDE interface it is meant that the interface presents a set of registers appearing in size, number, and behavior as belonging to an IDE device and IDE controller, when in fact no such device exists. Such a non-existent device is said to be a "virtual IDE device." The just-mentioned registers serve as an interface between the virtual IDE functionality provided by the integrated multifunction device 118 and software running on the CPU 102. In other words, data is read from and written to the IDE function by reading from and writing to the registers. Further, the behavior of the IDE function is controlled by writing to and reading from the registers in a manner to mimic the behavior of an IDE device.

As discussed in greater detail below, the integrated multifunction device 118 is accessed in a manner identical to that of an IDE device. The device 118 receives commands, and forwards the commands via a network to a remote computer that interprets the commands and accesses a data set, in response to the commands. For example, the device 118 may receive a command to read a given disc sector. The device 118 forwards the command, via the network, to a remote computer. The remote computer accesses a data set to find the information that would have been found had the disc sector been read by a physically present device. The data is returned to the device 118 via the network. The device 118 returns the data to the host via the virtual IDE interface 122.

Notably, in one embodiment, such a computer system 100 does not have a physical drive present. In other words, IDE device 126 is absent, as might be the case in the context of a network computer. All drive access commands are routed through the device 118 to the aforementioned remote computer. In another embodiment, though, the computer system 100 may has a physical drive, such as IDE device 126 present, as shown in FIG. 1.

Figure 2:
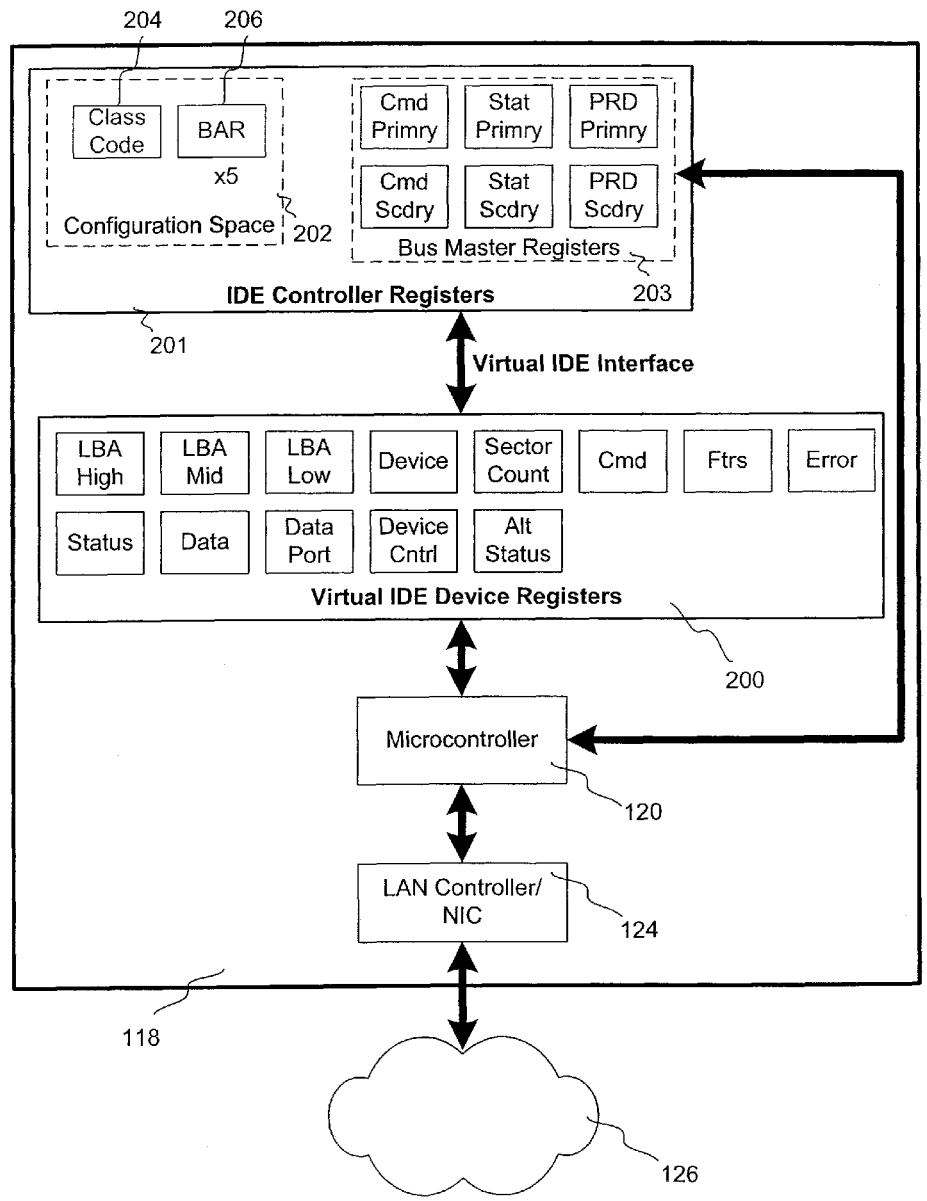
FIG. 2 depicts an integrated multifunction device, including a virtual IDE interface.

FIG. 2 depicts the integrated multifunction device 118 in greater detail, including a set of virtual IDE device registers 200 and a set of virtual IDE controller registers 201. As can be seen, the microcontroller 120 residing on the integrated multifunction device 218 is coupled to a set of virtual IDE device registers 200. The set of virtual IDE device registers includes: (1) the logical block address—high register (LBA High); (2) the logical block address—mid register (LBA Mid); (3) the logical block address—low register (LBA Low); (4) the device register; (5) the sector count register; (6) the command register (Cmd); (7) the features register (Ftrs); (8) the error register; (9) the status register; (10) the data register; (11) the data port; (12) the device control register (Device Cntrl); and (13) the alternate status register (Alt Status).

The uses and purposes of the above-mentioned registers are known for IDE devices, and are described by the ANSI standards mentioned above. Briefly, the command register is used to instruct the device to perform a particular operation. The use of the remainder of the registers are command-specific (or device-specific), and their use is known by those skilled in the art.

The set of virtual IDE controller registers 201 includes the configuration space registers 202 and the bus master registers 203. As suggested by the name, the virtual IDE controller registers 201 are dimensioned in size and quantity to be identical to the registers ordinarily found in a standard IDE controller (like the one in identified by reference numeral 114 in FIG. 1, embodied in the I/O control hub 110). The uses and purposes of the configuration space registers 202 are known in the art, and are discussed below. The uses and purposes of the bus master registers 203 are also known in the art. Generally speaking, the bus master registers are used for direct memory access (DMA) read and write operations. For the general orientation of the reader, the uses and purposes of the bus master registers 203 are briefly described below.

As can be seen from FIG. 2, the bus master registers 203 contains two sets of three registers (additional non-standard registers may also be included, but are not depicted). One set corresponds to a primary IDE cable; the other, to the secondary IDE cable. Each set contains a Bus Master Command register (Cmd Primry and Cmd Scdry). These registers control the bus master operation, and determine whether the operation is a DMA read or a write. They may also start and stop the bus operation. Each set also contains a Bus Master IDE Status register (Stat Primry and Stat Scdry). These registers reveal whether bus master DMA is active, and also contain an interrupt report status bit. Further, each set also contains a Bus Master IDE PRD Table Address register (PRD Primry and PRD Scdry). These registers contain a pointer to a descriptor table. Each descriptor points to an area of host memory to or from which data is to be written or read.

As stated above, the microcontroller 120 executes firmware or software stored in a memory device (not depicted), which causes the microcontroller 120 to read from and write to the registers 200 and 203 as though the integrated multifunction device 118 actually was an IDE controller with an IDE device or IDE devices coupled thereto. Presented below is an example of how a real IDE device might use its device registers (see FIG. 3), followed by an example describing a virtual IDE device using the virtual IDE device registers 200 in a virtual IDE device. The uses are parallel. The examples are intended to provide a flavor of the manner in which the microcontroller 120 can read from and write to the registers 200 and 203 to emulate the behavior of an actual IDE controller with an actual IDE device coupled thereto, from the vantage of the CPU 102.

Figure 3:
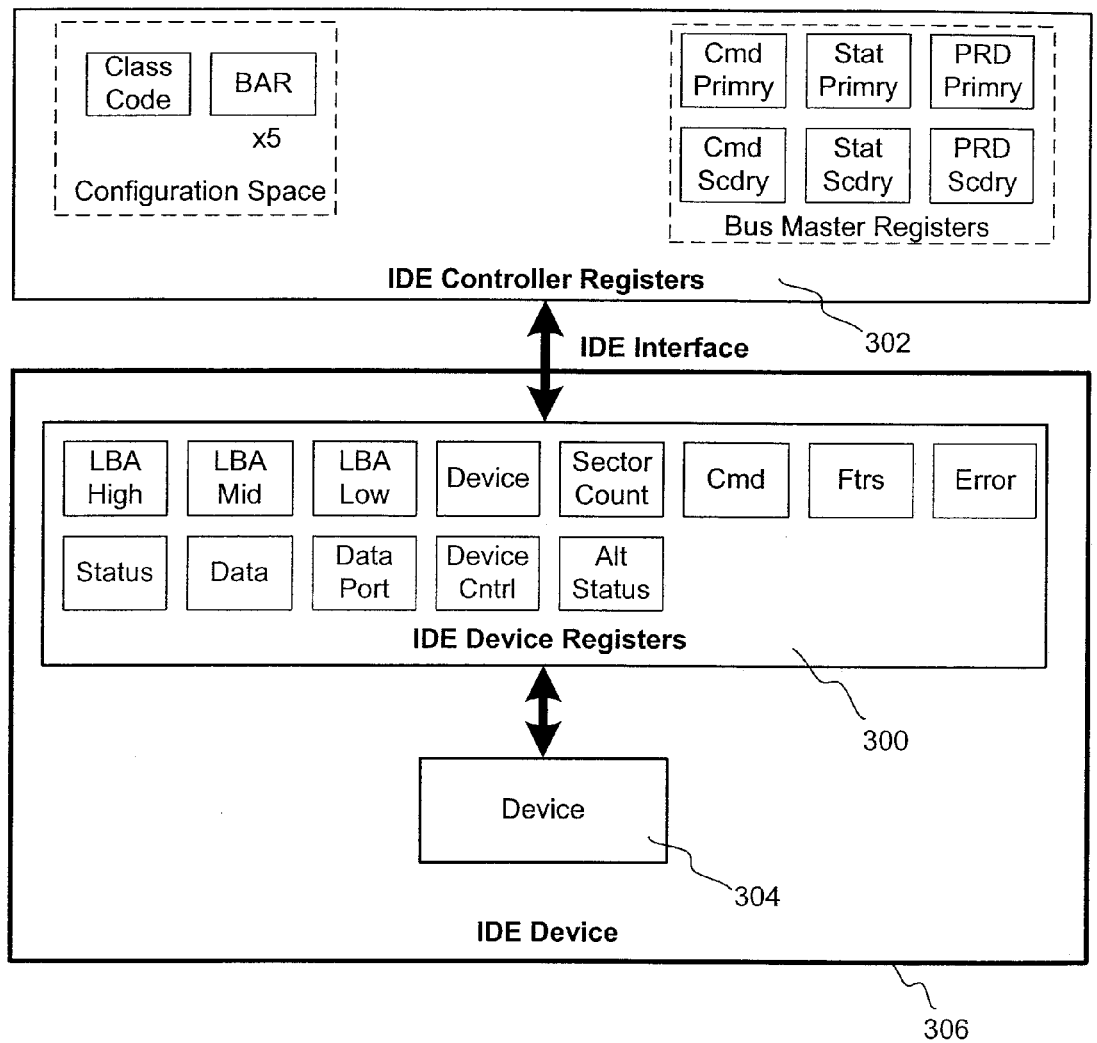
FIG. 3 depicts a disc device having an IDE interface, as is known in the prior art.

Shown in FIG. 3, is a set of IDE device registers 300 associated with a real IDE controller 302 and a real IDE device 304. The set of IDE device registers 300, and the IDE device 304 are contained within a housing 306. In the context of a READ SECTORS command, the CPU (not depicted in FIG. 3) indicates the starting logical block of the sectors to be read in the LBA Low, LBA Mid, and LBA High registers, indicates the number of sectors to be read in the sector count register, and indicates which device the command is directed toward (i.e., master or slave) with the device register. After having loaded the appropriate values in the above-mentioned registers, the command register is written to, in order to indicate that the READ SECTORS command is to be performed by the IDE device 304. After the command register is written with the appropriate command code, the command is executed, the device is indicated as busy, and the data is prepared. When the data is ready to be read from the data register, the status register indicates that the device is not busy, and the data request bit therein is asserted. The host (i.e., the computer to which the device is attached) responds by obtaining the data from the device, by virtue of a series of reads from the data register. The data is transferred to the host in blocks, and a series of state transitions occur in both the host and the IDE controller 302 and IDE device 304 to permit the transfer to take place. The details of the state transitions are known in the art and are beyond the scope of this disclosure.

Returning to FIG. 2, therein is depicted a set of virtual IDE device registers 200. By this, it is meant that although the set of IDE device registers 200 exists, there exists no IDE device associated therewith. From the vantage of the CPU (not depicted), however, it is not apparent that no actual IDE device exists. The microcontroller 120 reads from and writes to the set of virtual IDE device registers 200 and bus master registers 203 in a manner mimicking that of a real IDE controller with a real IDE device coupled thereto (i.e., the arrangement of FIG. 3). Thus, for example, when the host requests a READ SECTORS command to be executed by the virtual IDE device, it does so in the same way that it requested a READ SECTORS command to be executed by a read IDE device. Specifically, the host indicates the starting logical block of the sectors to be read in the LBA Low, LBA Mid, and LBA High registers, indicates the number of sectors to be read in the sector count register, and indicates which device the command is directed toward (i.e., master or slave) with the device register. After having loaded the appropriate values in the above-mentioned registers, the host writes the command code indicating the READ SECTORS command to the command register. In the wake of writing to the command register, hardware sets the device busy bit in the status register and alternate status register, and the microcontroller 120 reads the virtual set of IDE device registers 200 (alternatively, the device busy bit in the status register may be set by the microcontroller 120, upon the command register being written to). Thereafter, the microcontroller 120 communicates the READ SECTORS command via a network controller 124 and network to a management console (discussed in further detail, below). The management console receives the READ SECTORS command, interprets the command, prepares the data based upon image data stored at the management console, and returns the data to the microcontroller 120. When the data is received by the microcontroller 120 and is ready to be read from the data register in the virtual IDE interface 200, the microcontroller 120 writes to the status register to indicate that the device is not busy, and asserts the data request bit therein. The host responds by obtaining the data from the device, by virtue of a series of reads from the data register. Again, the data is transferred to the host in blocks, and the microcontroller 120 controls the registers of the virtual interface 200, so as to cause the host to traverse the same series of state transitions it would traverse, if a real IDE device were coupled to the virtual set of IDE device registers 200 and were transferring the data to the host. Thus, from the vantage of the CPU 102, the virtual set of IDE registers 200 and bus master registers 203 may be used in an identical manner to that of a real IDE controller with a real IDE device coupled thereto.

One advantage of employment of a set of virtual IDE device registers and bus master registers is that the redirective capacity of the computing system employing such registers does not hinge upon the design of the BIOS or operating system. Instead, the redirective capacity of the system results from the ability of a device having access to a network to present a set of registers to the CPU that is indistinguishable from a real IDE controller and device. Therefore, a redirection scheme employing a set of virtual IDE device registers (such as registers 200) and bus master registers (such as registers 203) can be used to install an operating system.

Returning to FIG. 2 and a discussion of the structure of the integrated multifunction device 118, the integrated multifunction device 118 may also include a LAN controller 124. The LAN controller 124 includes a set of registers through which the CPU 102 interfaces with the LAN controller 124 functionality. Of course, the LAN controller 124 also includes circuitry to perform low-level functionality including interfacing with the physical communication medium.

The integrated multifunction device 118 may embodied as a single chip, or may be embodied as multiple chips that cooperate with one another.

A set of virtual IDE device registers may be made available to a CPU by providing a configuration space that announces the presence of an IDE interface function in a device. For example, if the integrated multifunction device 118 is a PCI compatible device, then it includes a PCI configuration space 202, which is a set of registers including a class code register 204 and 5 base address registers (BARs) 206. The class code register 204 contains a value identifying the sort of function provided by the device. Thus, in the context of a device providing a virtual IDE device (or an ordinary IDE device), the class code register 204 contains a value identifying an IDE interface function. The base address registers 206 is provided in the configuration space 202 so that the BIOS may store therein I/O addresses pointing to the set of virtual IDE device registers 200 (or one or more registers therein). During startup, the BIOS traverses each I/O bus (such as PCI bus 116) and seeks out each device. Each device found is enumerated. Furthermore, the BIOS seeks out each function offered by each device. Each function of each device is also enumerated. During this process, the BIOS stores an I/O address in each of the base address registers of the configuration space associated with each function of each device. Based on the I/O addresses stored in the base address registers, the BIOS can determine how to address a particular function on a particular device.

Figure 4:
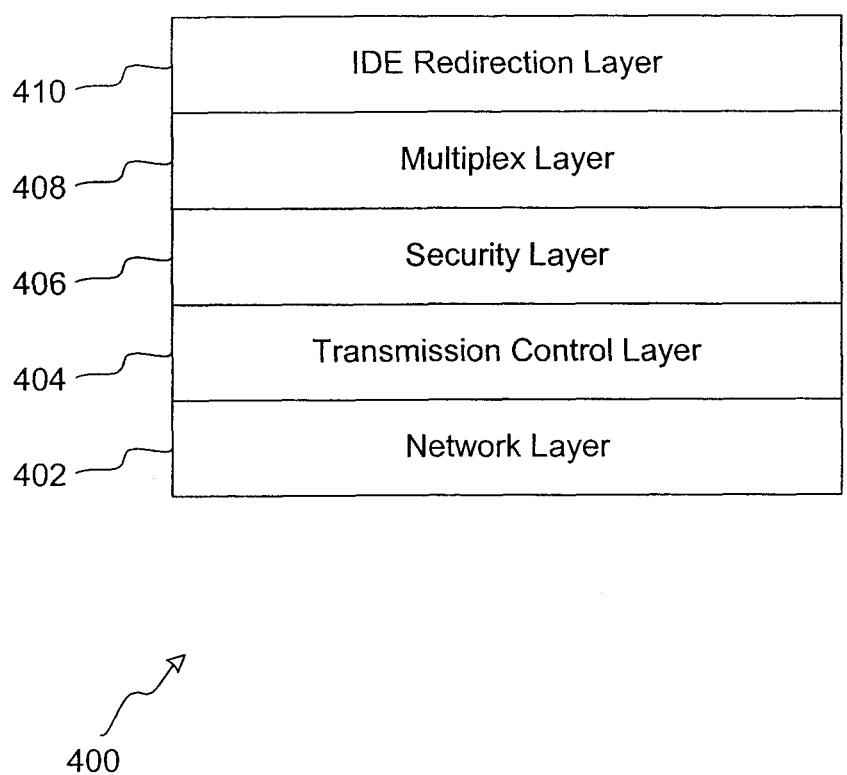
FIG. 4 depicts a protocol stack that my be used to provide an IDE redirection session.

The integrated multifunction device 118 may execute a protocol stack 400, such as the one shown in FIG. 4. In FIG. 4, a given layer depicted therein provides services to layers located above it. As can be seen, the stack 400 includes a network layer 402. In one embodiment, the network layer 402 includes software/firmware providing internet protocol (IP) functionality. The IP functionality provided by the network layer 402 is made available to the transmission control layer 404.

According to one embodiment, the transmission control layer 404 includes software/firmware that provides transmission control protocol (TCP) functionality. According to another embodiment, the transmission control layer 404 is software/firmware that provides user datagram protocol (UDP) functionality. The TCP or UDP functionality provided by the transmission control layer is provided to the security layer 406.

The security layer 406 is an optional layer that is activatable and deactivatable. According to one embodiment, the security layer 406 includes software/firmware that provides transport layer security (TLS) functionality. According to another embodiment, the security layer 406 includes software/firmware that provides security defined by the Intelligent Platform Management Interface (IPMI). The security functionality provided by the security layer 406 is made available to the multiplex layer 408.

The multiplex layer 408 is, again, an optional layer. It may be present on a computing system running other forms of redirection (such as serial-over-LAN redirection, discussed below). The multiplex layer 408 is responsible for determining which application the data is destined for (IDER or serial-over-LAN, or other application). The functionality provided by the multiplex layer is made available to an IDE redirection layer 410.

The IDE redirection layer 410 performs many tasks, which are aimed at the goal of receiving data from the virtual IDE interface and delivering them to the LAN controller, and vice versa. The IDE redirection 410 layer is discussed in greater detail, below.

The software/firmware making up the network layer 402 may be executed by the LAN controller 124. The software/firmware making up the other layers 404-410 may be executed by the microcontroller 120 in the integrated multifunction device 118.

In operation, the IDE redirection layer 410 receives data from the set of virtual IDE device registers 200, and packages the data therein into commands that are passed downwardly through the protocol stack, destined to be received by a management console (discussed below). As the protocol stack is executed, the commands are packetized and ultimately transmitted through the network, eventually being received by the aforementioned management console.

The management console (not depicted) is a computer system that communicates with the managed computing system 100 (FIG. 1). The term "managed computing system" refers to a system employing an IDE redirection scheme, such that it receives device data from a remote system (i.e., management console). The management console runs an identical protocol stack (such as 400), so that it can properly interpret the commands received from the managed computing system 100.

IT personnel at the management console may activate the IDE redirection layer (discussed in more detail below), and may instruct the managed computing system to boot-up using the virtual IDE device. Then, the IT personnel may re-boot the managed system 100. The managed system 100 then accesses the virtual IDE device in the same manner it accesses an ordinary, physically present device. The IDE commands from the managed system are forwarded to the management console. The management console maintains a set of image device data for the managed system 100. The management console interprets the IDE commands and operates upon the image device data (i.e., reads from the image data, writes to the image data, etc.). In this way, for example, IT personnel may reinstall an operating system on the managed system 100 without having to be physically present to do so.

Figure 5:
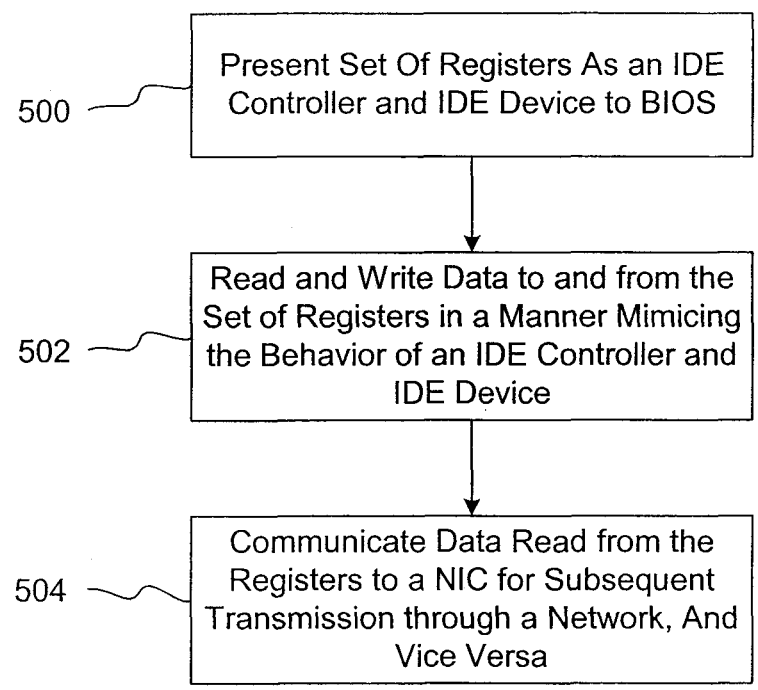
FIG. 5 depicts one scheme by which a virtual IDE device may be presented to a CPU.

As shown in FIG. 5, a managed computing system (such as computing system 100) may execute the following acts. First, as depicted by operation 500, a set of registers dimensioned in size and number to mimic that of an IDE controller and IDE device are presented to the BIOS as an ordinary IDE controller and IDE device. In the context of performing that task with a PCI device, this includes providing a PCI configuration space having a class code register that identifies the PCI device as having an IDE function, and further having base address registers that can be programmed to point at the aforementioned sets of registers.

Next, as shown in operation 502, a microcontroller coupled to the aforementioned sets of registers is programmed to read and write data to and from the registers in a manner mimicking the behavior of an ordinary IDE controller and IDE device. This may include providing an IDE redirection layer 410, as shown in FIG. 4, and as is discussed in greater detail, below.

Finally, as shown depicted by operation 504, data read from the aforementioned set of registers is communicated to a LAN controller (or network interface chip) for communication through a network to a management console or other computing system. Of course, data received from the management console via the LAN controller 124 is unpacked into the aforementioned registers for retrieval by the CPU of the managed system. Operation 504 may include execution of a protocol stack, such as that shown in layers 402-408 in FIG. 4.

Figure 6:
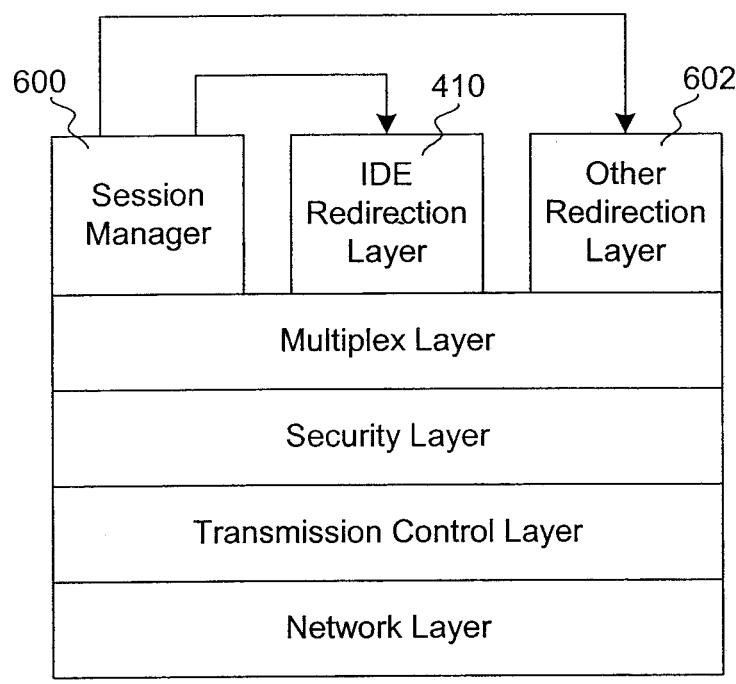
FIG. 6 depicts another protocol stack that my be used to provide an IDE redirection session.

FIG. 6 depicts one possible embodiment of the protocol stack 400 depicted in FIG. 4. As shown in FIG. 6, the IDE redirection layer 410 shown in FIG. 4 may be controlled by a session manager 600. Briefly, the session manager 600 is responsible for opening a redirection session (such as an IDE redirection session), and in some situations is responsible for ensuring that fewer than some maximum number of such sessions are open (example: limit the number of simultaneous IDE redirection sessions to only a single such session). The operation of the session manager 600 is discussed in more detail, below.

As can also be seen from FIG. 6, a redirection session other than an IDE redirection session may also be supported by the multifunction integrated device 118. For example, the integrated multifunction device 118 may also provide a set of registers dimensioned in size and number to be identical to that of a serial port interface (COM port interface). In other words, a virtual COM port may be provided by the integrated multifunction device 118. The microcontroller 120 in the integrated multifunction device 118 may be programmed to cooperate with a remote management console, so that the microcontroller 118 redirects text-mode screen data to the management console, and receives keystroke data therefrom.

Previously, it was mentioned that IT personnel could use the management console to instruct the managed computing system to boot up from the virtual IDE device, as opposed to booting up from a physically present device. The IT personnel may use the virtual COM port functionality to view the BIOS menus at the management console. Also, the IT personnel could enter keystrokes at the management console. Those keystrokes are redirected to the managed system via the virtual COM port, and are treated as keystrokes from a keyboard that is physically present at the managed system. Thus, the IT personnel may enter keystrokes at the management console to alter a BIOS menu (e.g., boot menu), causing the managed system to boot-up from a virtual IDE device. Such functionality is provided by the redirection layer 602, which provides redirection functionality other than IDE redirection, such as serial-over-LAN redirection.

Figure 7:
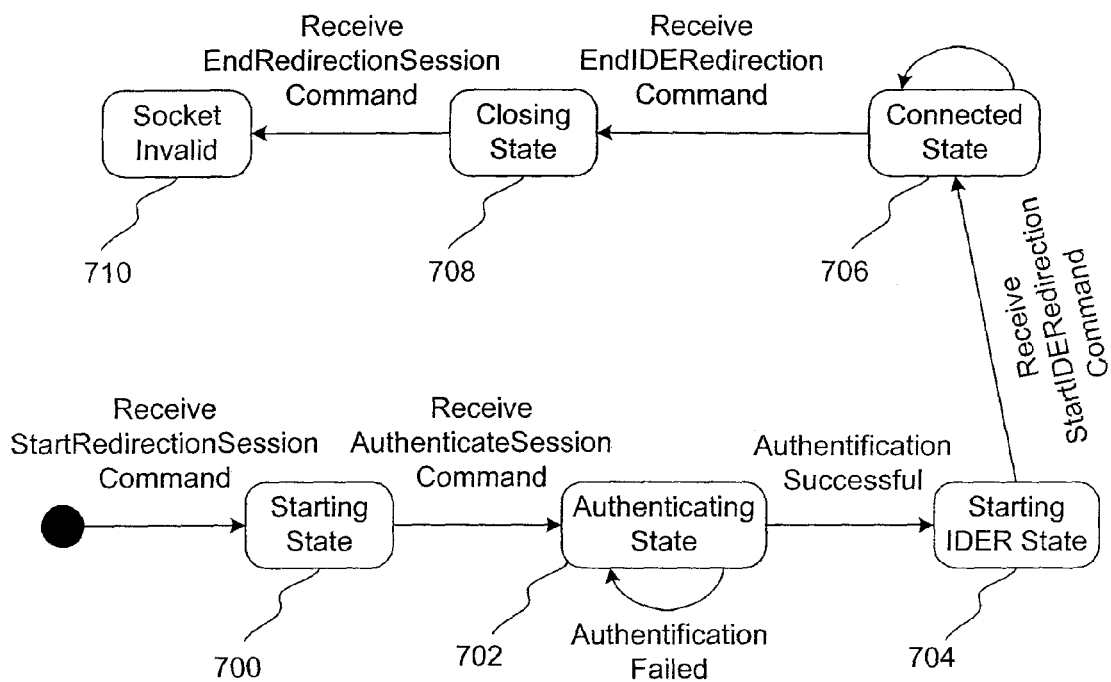
FIG. 7 depicts a state flow diagram that describes one example of a state flow that may be enacted by an IDE redirection layer.

FIG. 7 depicts one embodiment of the joint flow of operation of the session manager 600 and the IDE redirection layer 410 (other embodiments are possible). As shown in FIG. 7, the session manager 600 may be initially set in motion by the reception of a StartRedirectionSession command from management console. (Of course, commands from the management console are received by way of the LAN controller 124 in the integrated multifunction device 118). The StartRedirectionSession command is the first command that the management console generally sends to the computing system under management 100. Basically, this command identifies what kind of redirection session should be started (i.e., should an IDE redirection session be started, or should another form of redirection session, such as a serial-over-LAN session, be started). Thus, the StartRedirectionSession command may include at least one argument, in order to fulfill its role of identifying the sort of redirection session to be started.

The StartRedirectionSession command is received by the session manager 600, which causes the session manager 600 to transition to the starting state 700. During the starting state 700, the session manager 600 determines whether opening the requested redirection session would result in more than a maximum number of permitted sessions to be opened. If so, the session manager 600 does not open the requested redirection session. On the other hand, if opening the requested session would not result in more than a maximum number of permitted sessions, the session manager 600 continues forward in its procedure to open a session. Either way, the session manager 600 replies to the management console by sending a StartRedirectionSessionReply message. This message indicates whether the maximum number of redirection sessions is already open, and also indicates whether the particular variety of redirection session requested by the management console is supported by the computing system under management 100.

The session manager 600 remains in the starting state 700 until it receives an AuthenticateSession command from the management console, whereupon it transitions to the authenticating state 702. The AuthenticateSession command identifies a process by which the management console may identify itself, so that the managed computing system 100 can verify that the console indeed has the authority to start the redirection session. For example, the AuthenticateSession command may include arguments such as a user name and password, for the aforementioned purpose. If the authentication fails (e.g., the username or password provided by the management console is incorrect), then the session manager 600 remains in the authenticating state 702, awaiting an AuthenticateSession command with a correct username and password. An AuthenticateSessionReply message is returned to the management console indicating that the authentication failed. On the other hand, if the authentication is successful, an AuthenticateSessionReply message is returned to the management console indicating the success, and the IDE redirection layer 410 transitions to the starting IDE redirection state 704.

Figure 8:
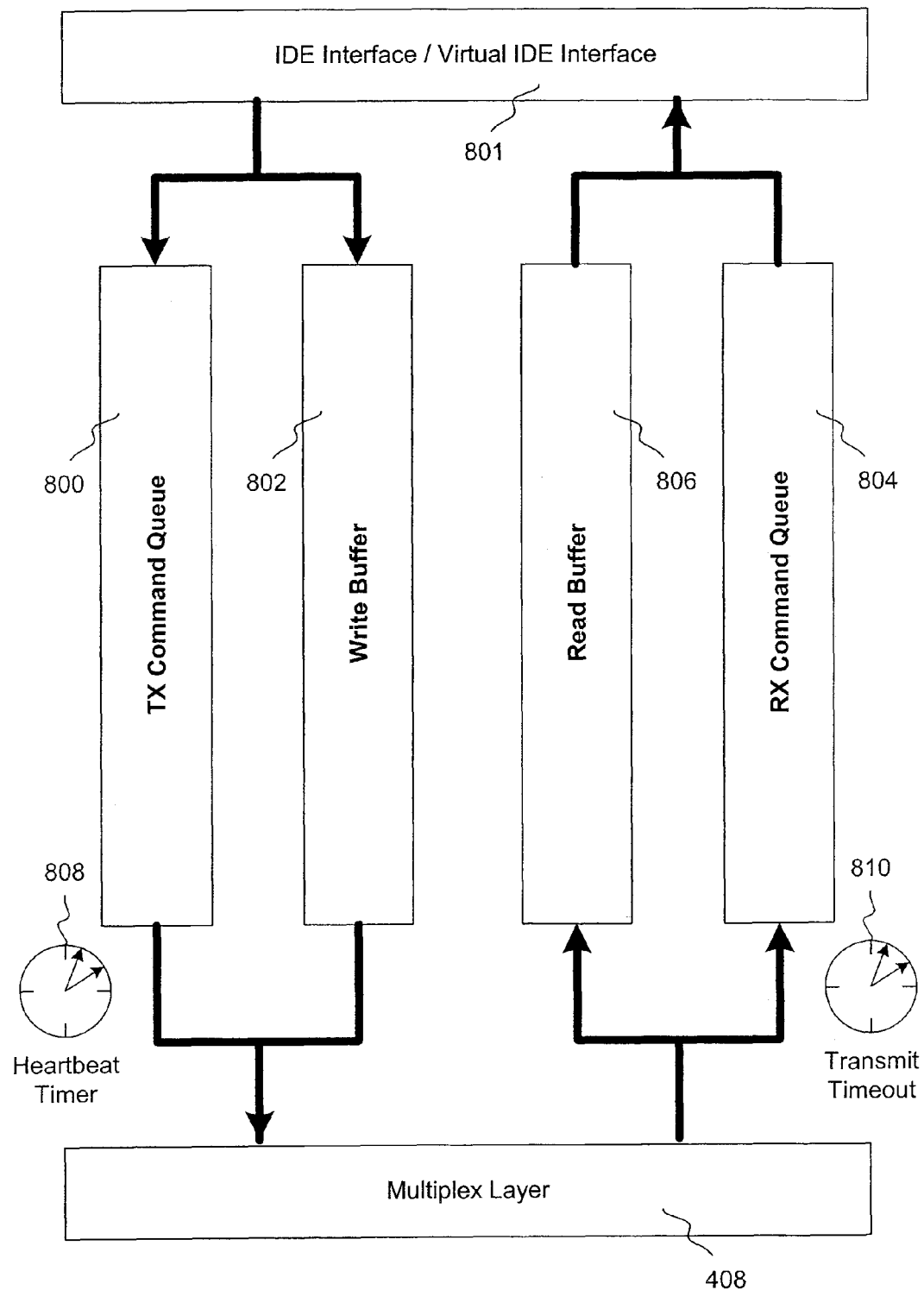
FIG. 8 depicts one example of an IDE redirection layer.

In the starting IDER state 704, the IDE redirection layer 410 awaits a StartIDERedirection command from the management console. The StartIDERedirection command tells the IDE redirection layer 410 that it should start forwarding host IDE commands to the management console. In other words, it marks the beginning of the IDE redirection session. The SartIDERedirection command may contain certain arguments that configure the IDE redirection layer 410. FIG. 8 depicts the general structure of the IDE redirection layer 410. Briefly, the IDE redirection layer 410 includes a transmission command queue 800, a transmission data buffer (write buffer) 802, a reception command queue 804, and a reception data buffer (read buffer) 806. The IDE redirection layer 410 may also include two clocks: (1) a heartbeat timer 808; and (2) a session timeout timer 810.

During operation, redirected IDE commands are entered into the transmission command queue 800. Any data associated with the command is entered into the write buffer 802. When the previous command is completed (this is indicated by receipt of a reply message from the management console, as discussed below), the next command is removed from the transmission command queue 800, repackaged into an IDE redirection layer command, and sent to the multiplex layer 408 for communication to the management console. Any data associated with the command is removed from the write buffer 802, bundled into the associated IDE redirection command, and placed sent to the multiplex layer 408, as well.

Commands received from the management console are received from the multiplex layer 408 and are placed into the reception command queue 804. Any data associated therewith (e.g., data read from the device image data set maintained at the management console) is placed in the read buffer 806. Upon the occurrence of certain state transitions, the commands and data are removed from the reception queue 804 and read buffer 806 and unpackaged into the appropriate registers in the virtual IDE interface 801.

The IDE redirection layer 410 includes a heartbeat timer 808. Upon expiration of the heartbeat timer 808, a heartbeat message is communicated to the management console to indicate that the IDE redirection session is still active. The heartbeat timer 808 is reset every time a heartbeat message is sent or any other message/command is sent to the management console. The StartIDERedirection command may include an argument that configures the heartbeat timer 808 to expire after a selected period of time (e.g., the StartIDERedirection command may configure the heartbeat timer 808 to expire after 100 ms or 200 ms).

The StartIDERedirection command may also include an argument that configures the session timeout timer 810 to expire after a chosen period of time. Upon expiration of the session timeout timer 810, the IDE redirection session is terminated, as it is inferred that the management console is no longer in communication with the computing system under management 100 for one reason or another. The session timeout timer 810 is reset every time a message is received from the management console.

The StartIDERedirection command may also set an initial value for a console sequence number. Each subsequent message from the management console includes a console sequence number, with each successive message containing a sequence number that has been incremented by one. The console sequence number ensures that its messages are received and acted upon in the correct order at the managed computing system 100. The sequence number is important in the context of UDP implementations.

Upon reception of the StartIDERedirection command, the IDE redirection layer 410 transitions from the starting IDE state 704 to the connected state 706. To indicate that such a transition has been made, a StartIDERedirectionReply message is sent to the management console. The StartIDERedirectionReply message informs the management console that the IDE redirection session has started. Additionally, it may include arguments indicating the size of the read buffer 806 and write buffer 802. The management console should not send data in blocks larger than the size of the read buffer 806, because the IDE redirection layer 410 would not be able to enter such a block of data into the buffer 806. Additionally, the management console should not request the IDE redirection layer 410 to request from the host a data block larger than the size of the write buffer 802, because the IDE redirection layer 410 would not be able to enter such a block of data into the buffer 802. In some instances, the length of the read or write buffers 806 and 802 may be constrained to be a multiple of four bytes.

During the tenure of the connected state 706, the IDE redirection layer 410 awaits the occurrence of certain events. In response to these events, the IDE redirection layer 410 reacts as depicted in FIG. 9.

When a command code is written to the command register in the virtual IDE interface 200, the connected state 706 transitions from an awaiting event operation 900 to a send CommandWritten message operation 902. It should be noted that if the command code written to the command register is a PACKET command, then the transition to the send CommandWritten message operation 902 does not occur until the packet data is written to the data register. During execution of the send CommandWritten operation 902, a CommandWritten message is sent from the IDE redirection layer 410 to the multiplex layer 408, for ultimate delivery to the management console.

The CommandWritten message includes arguments to convey the contents of each of the registers of virtual IDE interface (e.g., an argument to convey the content of the command register, the LBA High register, the LBA Mid register, etc.). The CommandWritten message also includes an argument to convey any PACKET data that may accompany a PACKET command. Thus, the management console may completely reconstruct the IDE (ATA/ATAPI) command from the arguments conveyed by the CommandWritten message. After sending the CommandWritten message to the multiplex layer 408, the connected state 706 returns to the awaiting event operation 900.

Figure 9:
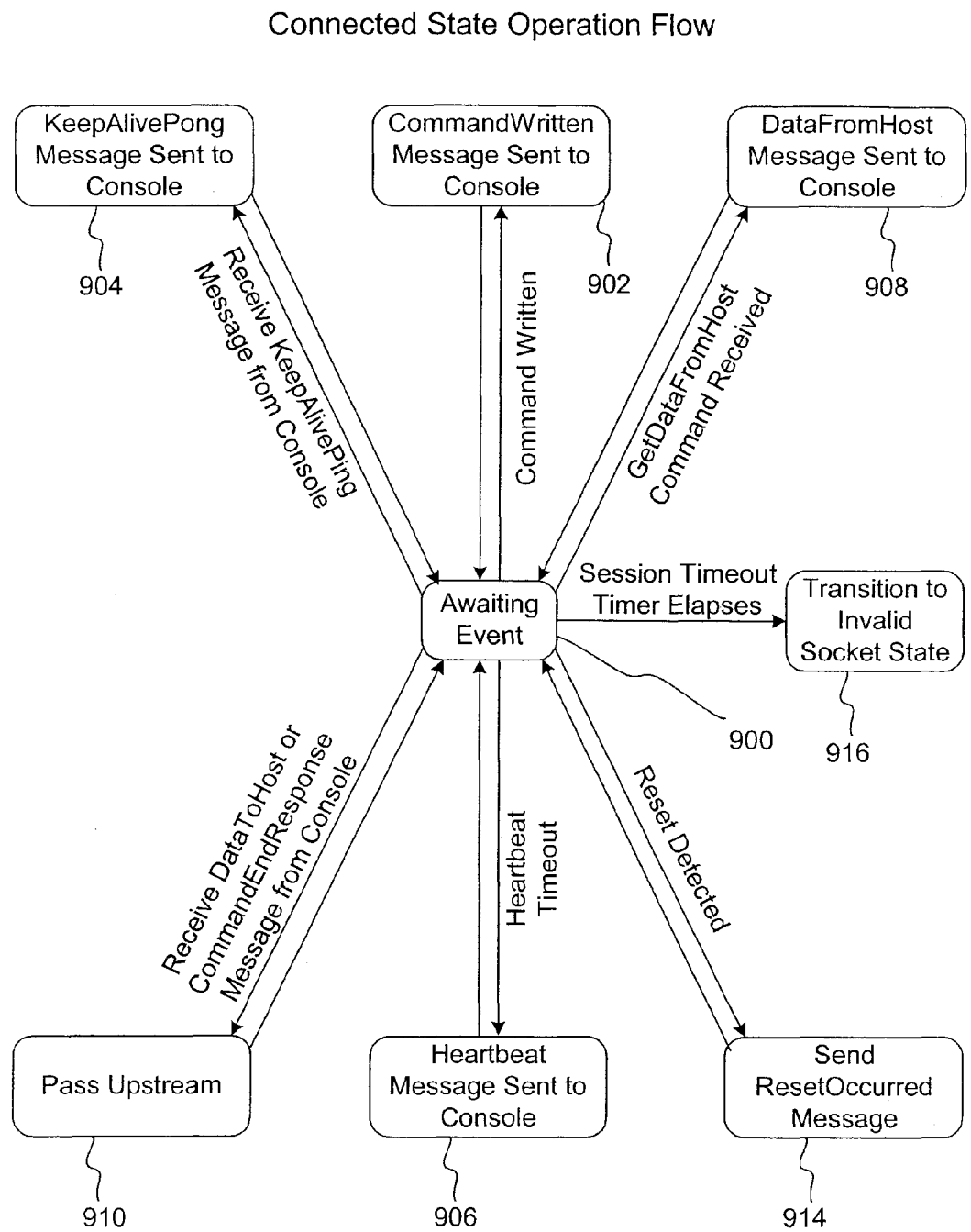
FIG. 9 depicts a flow of operations that may be enacted during a connected stated of operation of the IDE redirection layer.

As shown in FIG. 9, the management console may transmit a KeepAlivePing message. The management console may send such a message to the managed computing system 100 when a given period of time has passed without either receiving a message from the system 100 or sending a message to the system 100. In response to reception of a KeepAlivePing message, the connected state 706 transitions from the awaiting event operation 900 to the send KeepAlivePong message operation 904. During this operation 904, a KeepAlivePong message is returned to the management console (by way of the multiplex layer 408). After transmission of the KeepAlivePong message, the connected state returns to the awaiting event operation 900. By virtue of this "ping" and "pong" exchange, the management console can verify that the IDE Redirection session is still active. If, after transmission of a KeepAlivePing message, a given period of time elapses without the management console receiving a KeepAlivePong message, the management console closes the serial-over-LAN session, based on the assumption that the session is no longer active for one reason or another.

As is also shown in FIG. 9, upon the heartbeat timer 808 elapsing, the connected state 706 transitions from the awaiting event operation 900 to the send heartbeat message operation 906. This message serves a similar purpose to that of the KeepAlivePong, i.e., it confirms to the management console that the redirection session is still valid. Upon transmission of heartbeat message, the connected state 706 returns to the awaiting event operation 900.

In the wake of an ATAPI write command having been sent to the management console (via a CommandWritten message, discussed above), the IDE redirection layer 410 may receive a GetDataFromHost command from the management console. The GetDataFromHost command includes arguments for each of the registers in the virtual IDE interface 200. Of note, the GetDataFromHost command includes arguments indicating the number of bytes the host should transfer to the IDE redirection layer 410, and an argument indicating the mode of the transfer (PIO or DMA). Thus, the IDE redirection layer may unpack the GetDataFromHost command, entering its contents into the appropriate registers of the virtual IDE interface 200, and thereby prompting the host to transfer data to the IDE redirection layer 410.

Upon receiving the data from the host, the IDE redirection layer transitions to the send DataFromHost message operation 908. During the execution of this operation 908, a DataFromHost message is sent to the management console. The DataFromHost message includes arguments indicating the number of bytes in the DataFromHost message, the cable from which the data has been transferred (primary or secondary), and the data, itself. Upon transmission of DataFromHost message, the connected state 706 returns to the awaiting event operation 900.

In the wake of an ATAPI read command having been sent to the management console (via a Command Written message, discussed above), the IDE redirection layer 410 may receive a DataToHost command from the management console. Receipt of this message causes the connected state 706 to transition from the awaiting event operation 900 to the pass upstream operation 910. The DataToHost command includes the cable to which the data should go (primary or secondary), arguments for the registers in the virtual IDE interface 200, an argument indicating the number of data bytes being transferred, and the data, itself. The DataToHost command also includes a flag indicating whether all of the data has been transferred (i.e., whether or not there will be a subsequent DataToHost command). If the flag indicates that the DataToHost command is not the last one, then the data contained therein is unpacked into the virtual IDE interface 200, and is received by the host. If, on the other hand, the flag indicates that the DataToHost command is the last one, then the data is first unpacked and placed in the virtual IDE interface 200, and then the arguments indicating the contents of the various registers are unpacked and placed into the appropriate registers of the virtual IDE interface. Upon unpacking the DataToHost message, the connected state 706 returns to the awaiting event operation 900.

If a command simply did not require that data be transferred (to or from the host, from or to the management console, respectively), then the IDE redirection layer 410 may receive a CommandEndResponse message. The CommandEndRespons message includes arguments for the registers of the virtual IDE interface 200. Receipt of this message causes the connected state 706 to transition from the awaiting event operation 900 to the pass upstream operation 910. During execution of the pass upstream operation 910, the arguments indicating the contents of the various registers are unpacked and placed into the appropriate registers of the virtual IDE interface. Upon unpacking the CommandEndResponse message, the connected state 706 returns to the awaiting event operation 900. If an error occurred during execution of an IDE command or ATAPI command, the arguments included in the CommandEndRespons message contain the appropriate error values to be unpacked into the registers of the virtual IDE interface 200.

The IDE redirection layer 410 may detect the occurrence of a hardware or software reset. In response to such a detection, the connection state 706 transitions from the awaiting event operation 900 to the send ResetOccurred message operation 914. During the execution of this operation 914, a ResetOccurred message is transmitted to the management console to inform the management console of the reset. The ResetOccurred message includes an argument that indicates which device the reset occurred is directed toward (i.e., master or slave). Next, the IDE redirection layer 410 ignores all subsequent messages from the management console, except for a ResetOccurredResponse message, which confirms that the management console has ceased the execution of the last command.

As mentioned above briefly, the IDE redirection layer 410 includes a session timeout timer 810. The session timeout timer 810 is reset every time a message is received from the management console. Should the session timeout timer 810 expire, the IDE redirection layer 410 transitions to the socket invalid state 710 (FIG. 7), as shown by operation 916. The session timeout timer 810 allows the managed computing system 100 to infer that the redirection session has been compromised in some fashion (e.g., the communication link has been lost, or the management console has crashed, etc.), and to respond by invalidating the redirection session.

When finally the IT professional at the management console has completed his or her remote installation, diagnosis or configuration work upon the managed computing system 100, he or she may close the redirection session. The management console commands the closing of the redirection session by sending an EndIDERedirection command, as shown in FIG. 7. The EndIDERedirection command is received by the IDE redirection layer 410, and informs the layer 410 that the redirection session has ended, meaning that the layer 410 should cease forwarding any messages to the management console. Reception of the EndIDERedirection command causes the IDE redirection layer 410 to transition to the closing state 708. Upon transition into the closing state 708, the IDE redirection layer 410 transmits an EndIDERedirectionReply message to the management console, which is a message that confirms to the management console that the IDE redirection layer 410 has ended the redirection session.

The IDE redirection layer 410 remains in the closing state 708 until the reception of an EndRedirectionSession command. The EndRedirectionSession command is received by the session manager 600. It informs the session manager 600 that the redirection session has come to an end. In response, the session manager 600 closes the communication socket that had been utilized by the IDE redirection layer 410 during the redirection session. Therefore, the session manager 400 transitions to a socket invalid state 710. Although not depicted, reception of a StartRedirectionSession command causes the session manager 600 to transition from the socket invalid state 710 to the starting state 700, and the aforementioned state flow commences again.

The above-described protocol (with reference to FIGS. 7-9) may be used in concert with a TLS/TCP/IP protocol suite. The methods and schemes presented herein may also support IDE redirection via HTTP or HTTPS over TCP/IP, or any other transport protocol. Other protocols may be used in concert with a UDP/IP protocol suite that is protected by a security protocol defined by the internet protocol management interface (IPMI).

It should be noted that the protocol described with reference to FIG. 7-9 may be re-arranged to function so that the IDE redirection session is initiated by the managed system, rather than be the management console. Such a modification is useful in a scenario wherein the management console does not possess a priori knowledge of the network address at which a managed system can be reached.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

The claimed invention is:

1. An apparatus comprising:
a device comprising a central processing unit associated with registers, the registers being capable of being used by the central processing unit, when the device is in operation, so as to permit the device to:
receive a first command for communication between the device and a computer via a network, the device being remote from the computer, the communication to be via the network, the communication utilizing transport layer security, the communication including a network redirection session to communicate at least one of storage command and storage data, the at least one of the storage command and the storage data being redirected via the session, the session being to facilitate remote management of the device by the computer;
a maximum number of concurrent redirections being permitted between the device and the computer, the concurrent redirections including text data redirection, storage data redirection, and serial-over-local area network redirection;
receive a second command, the second command to result in stopping of redirecting;
receive a third command, the third command to result in ending of the redirecting.

2. The apparatus of claim 1, wherein:
verification is made that the computer has authority to initiate the session.

3. The apparatus of claim 1, wherein:
the at least one of the storage command and the storage data comprises at least one of an integrated device electronics (IDE) command and data.

4. The apparatus of claim 1, wherein:
the serial-over-local area network redirection comprises redirecting keystroke data from the computer to the device; and
the text data redirection comprises redirecting screen data.

5. The apparatus of claim 1, further comprising:
the network and the computer.

6. A method comprising:
receiving a first command for communication between a device and a computer, the communication to be via a network, the device being remote from the computer, the communication utilizing transport layer security, the communication including a network redirection session to communicate at least one of storage command and storage data, the at least one of the storage command and the storage data being redirected via the session, the session being to facilitate remote management of the device by the computer;
a maximum number of concurrent redirections being permitted between the device and the computer, the concurrent redirections including text data redirection, storage data redirection, and serial-over-local area network redirection;
receiving a second command, the second command to result in stopping of redirecting;

receiving a third command, the third command to result in ending of the redirecting.

7. The method of claim 6, wherein:
the first, second, and third commands are issued to the device from the computer; and
verification is made that the computer has authority to initiate the session.

8. The method of claim 6, wherein:
the at least one of the storage command and the storage data comprises at least one of an integrated device electronics (IDE) command and data.

9. The method of claim 6, wherein:
the serial-over-local area network redirection comprises redirecting keystroke data from the computer to the device; and
the text data redirection comprises redirecting screen data.

10. Non-transitory machine-readable memory storing instructions that when executed by a machine result in operations comprising:
receiving a first command for communication between a device and a computer, the communication to be via a network, the device being remote from the computer, the communication utilizing transport layer security, the communication including a network redirection session to communicate at least one of storage command and storage data, the at least one of the storage command and the storage data being redirected via the session, the session being to facilitate remote management of the device by the computer;
a maximum number of concurrent redirections being permitted between the device and the computer, the concurrent redirections including text data redirection, storage data redirection, and serial-over-local area network redirection;
receiving a second command, the second command to result in stopping of redirecting;
receiving a third command, the third command to result in ending of the redirecting.

11. The memory of claim 10, wherein:
the first, second, and third commands are issued to the device from the computer; and
verification is made that the computer has authority to initiate the session.

12. The memory of claim 10, wherein:
the at least one of the storage command and the storage data comprises at least one of an integrated device electronics (IDE) command and data.

13. The memory of claim 10, wherein:
the serial-over-local area network redirection comprises redirecting keystroke data from the computer to the device; and
the text data redirection comprises redirecting screen data.

* * * * *